(12) United States Patent
Hosseini et al.

(10) Patent No.: US 11,844,099 B2
(45) Date of Patent: Dec. 12, 2023

(54) SWITCHING AMONG SIDELINK BANDWIDTH PARTS

(71) Applicant: QUALCOMM Incorporated, San Diego, CA (US)

(72) Inventors: Seyedkianoush Hosseini, San Diego, CA (US); Wei Yang, San Diego, CA (US); Linhai He, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 17/247,817

(22) Filed: Dec. 23, 2020

(65) Prior Publication Data

US 2022/0201689 A1    Jun. 23, 2022

(51) Int. Cl.
| | |
|---|---|
| H04W 72/02 | (2009.01) |
| H04W 72/53 | (2023.01) |
| H04L 5/00 | (2006.01) |
| H04W 72/0453 | (2023.01) |
| H04W 80/02 | (2009.01) |
| H04W 72/20 | (2023.01) |
| H04W 92/18 | (2009.01) |

(52) U.S. Cl.
CPC ........... *H04W 72/53* (2023.01); *H04L 5/0055* (2013.01); *H04W 72/02* (2013.01); *H04W 72/0453* (2013.01); *H04W 72/20* (2023.01); *H04W 80/02* (2013.01); *H04W 92/18* (2013.01)

(58) Field of Classification Search
CPC ............. H04W 72/0493; H04W 72/02; H04W 72/0406; H04W 72/0453; H04W 80/02; H04W 92/18; H04L 5/0055; H04L 5/0096; H04L 5/001
See application file for complete search history.

(56) References Cited

U.S. PATENT DOCUMENTS

| | | | | |
|---|---|---|---|---|
| 2019/0082425 A1* | 3/2019 | Li | ............. | H04L 5/0055 |
| 2019/0191399 A1* | 6/2019 | Islam | ............. | H04W 72/046 |
| 2019/0200337 A1* | 6/2019 | Zhou | ............. | H04W 72/21 |
| 2019/0261406 A1* | 8/2019 | Kim | ............. | H04W 76/27 |
| 2020/0007297 A1* | 1/2020 | Hong | ............. | H04W 28/04 |
| 2020/0288434 A1* | 9/2020 | Choi | ............. | H04L 5/0091 |

(Continued)

FOREIGN PATENT DOCUMENTS

| | | |
|---|---|---|
| EP | 3836686 A1 | 6/2021 |
| WO | 2020030177 A1 | 2/2020 |
| WO | 2020130593 A1 | 6/2020 |

OTHER PUBLICATIONS

International Search Report and Written Opinion—PCT/US2021/072432—ISA/EPO—Mar. 17, 2022.

*Primary Examiner* — Edan Orgad
*Assistant Examiner* — Malick A Sohrab
(74) *Attorney, Agent, or Firm* — Arun Swain

(57) ABSTRACT

Various aspects of the present disclosure generally relate to wireless communication. In some aspects, a first user equipment (UE) may transmit, to a second UE in a sidelink communication with the first UE, an indication to switch from utilizing a first sidelink bandwidth part (SL-BWP) to utilizing a second SL-BWP. The UE may selectively switch from utilizing the first SL-BWP to utilizing the second SL-BWP based at least in part on receiving a positive acknowledgment message from the second UE. Numerous other aspects are provided.

30 Claims, 7 Drawing Sheets

(56) References Cited

U.S. PATENT DOCUMENTS

| | | | |
|---|---|---|---|
| 2020/0328865 A1* | 10/2020 | Choi | H04W 72/0453 |
| 2020/0351866 A1* | 11/2020 | Park | H04L 1/1861 |
| 2021/0306824 A1* | 9/2021 | Li | H04W 4/40 |
| 2021/0385694 A1* | 12/2021 | Freda | H04W 74/0816 |
| 2022/0070878 A1 | 3/2022 | Lee et al. | |
| 2022/0329368 A1* | 10/2022 | Zhao | H04L 5/0044 |
| 2023/0189370 A1* | 6/2023 | Park | H04W 72/25 370/329 |

* cited by examiner

SWITCHING AMONG SIDELINK BANDWIDTH PARTS

FIELD OF THE DISCLOSURE

Aspects of the present disclosure generally relate to wireless communication and to techniques and apparatuses for switching among sidelink bandwidth parts (SL-BWPs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a first user equipment (UE) for wireless communication includes a memory; and one or more processors operatively coupled to the memory, the memory and the one or more processors configured to: transmit, to a second UE in a sidelink communication with the first UE, an indication to switch from utilizing a first sidelink bandwidth part (SL-BWP) to utilizing a second SL-BWP; and selectively switch from utilizing the first SL-BWP to utilizing the second SL-BWP based at least in part on receiving a positive acknowledgment message from the second UE.

In some aspects, a method of wireless communication performed by a first UE includes transmitting, to a second UE in a sidelink communication with the first UE, an indication to switch from utilizing a first SL-BWP to utilizing a second SL-BWP; and selectively switching from utilizing the first SL-BWP to utilizing the second SL-BWP based at least in part on receiving a positive acknowledgment message from the second UE.

In some aspects, a non-transitory computer-readable medium storing a set of instructions for wireless communication includes one or more instructions that, when executed by one or more processors of a first UE, cause the first UE to: transmit, to a second UE in a sidelink communication with the first UE, an indication to switch from utilizing a first SL-BWP to utilizing a second SL-BWP; and selectively switch from utilizing the first SL-BWP to utilizing the second SL-BWP based at least in part on receiving a positive acknowledgment message from the second UE.

In some aspects, a first apparatus for wireless communication includes means for transmitting, to a second apparatus in a sidelink communication with the first apparatus, an indication to switch from utilizing a first SL-BWP to utilizing a second SL-BWP; and means for selectively switching from utilizing the first SL-BWP to utilizing the second SL-BWP based at least in part on receiving a positive acknowledgment message from the second apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
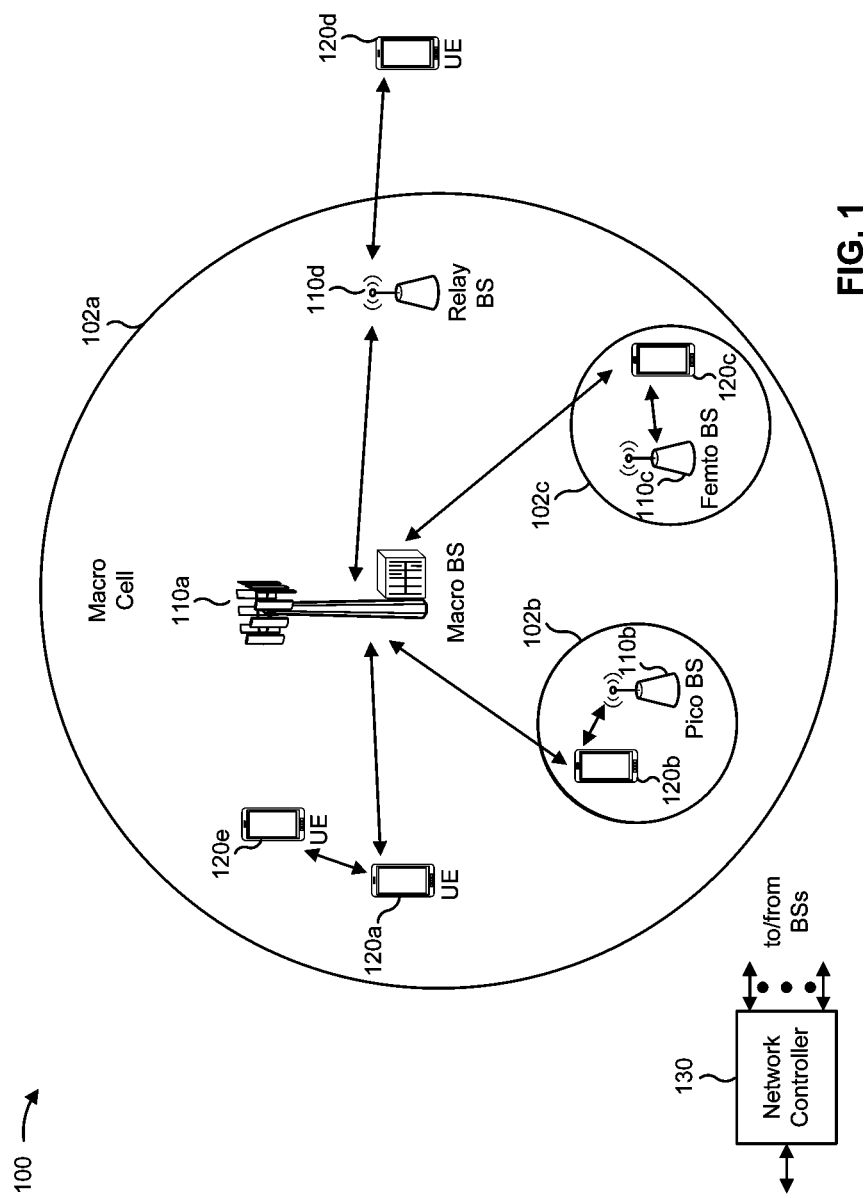
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
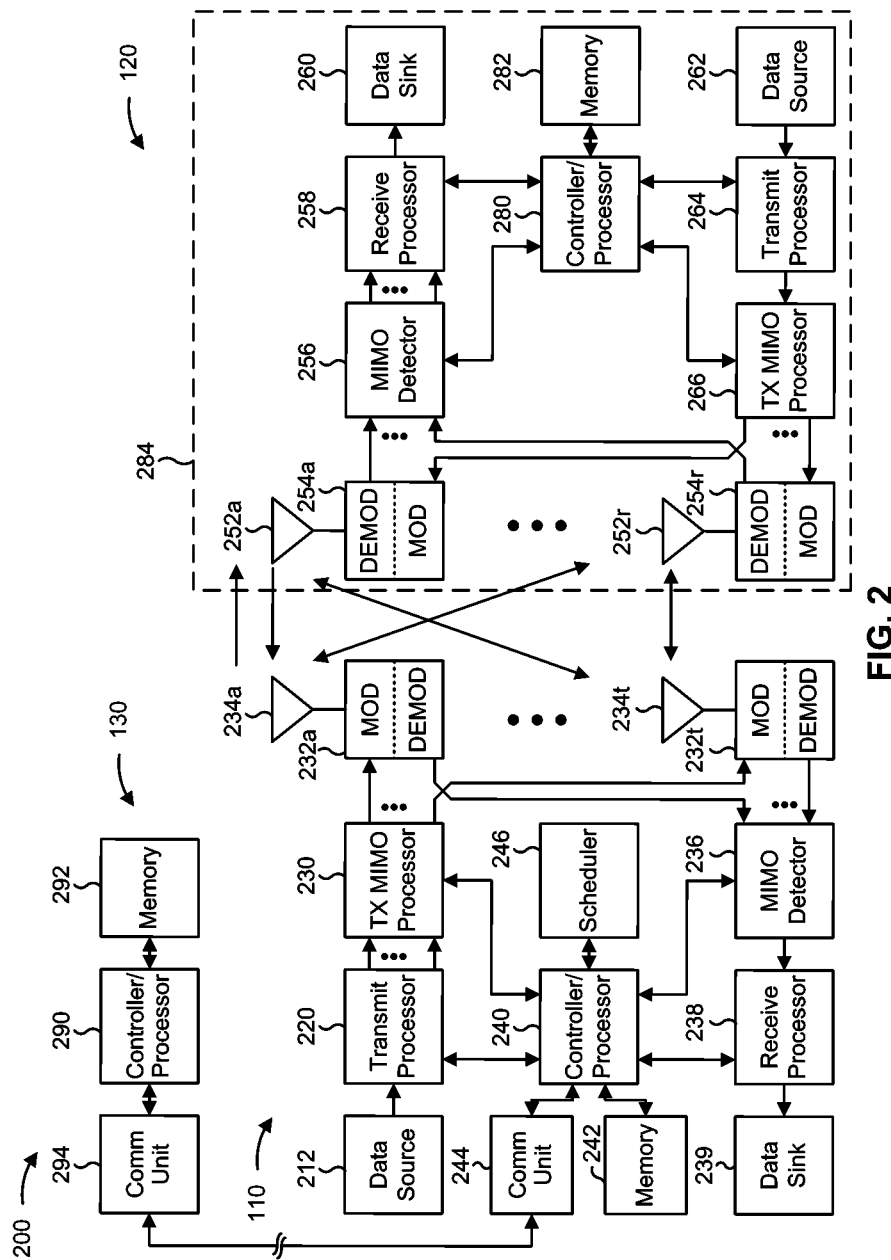
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-7.

Controller/processor 240 of base station 110, controller/processor 280 of UE 120, and/or any other component(s) of FIG. 2 may perform one or more techniques associated with switching among sidelink bandwidth parts (SL-BWPs), as described in more detail elsewhere herein. For example, controller/processor 240 of base station 110, controller/processor 280 of UE 120, and/or any other component(s) of FIG. 2 may perform or direct operations of, for example, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some aspects, executing instructions may include running the instructions, converting the instructions, compiling the instructions, and/or interpreting the instructions, among other examples.

In some aspects, the first UE includes means for transmitting, to a second UE in a sidelink communication with the first UE, an indication to switch from utilizing a first SL-BWP to utilizing a second SL-BWP; and means for selectively switching from utilizing the first SL-BWP to utilizing the second SL-BWP based at least in part on receiving a positive acknowledgment message from the second UE. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for receiving the positive acknowledgment message from the second UE.

In some aspects, the first UE includes means for mapping a communication associated with the second SL-BWP with a resource, associated with the first SL-BWP, utilized to receive the positive acknowledgment message.

In some aspects, the first UE includes means for re-transmitting the indication to the second UE when the positive acknowledgment message is not received from the second UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A sidelink network may include a base station and a plurality of UEs. The base station may communicate with each of the plurality of UEs via respective access links. The plurality of UEs may operate in sidelink modes to communicate (e.g., transmit and/or receive data) with one another via one or more sidelink channels.

In one sidelink mode (e.g., Mode-1 Resource Allocation Mode), the base station may configure and control utilization of sidelink resources (e.g., radio interface resources such as frequency resources and/or time resources) accessible for sidelink communications. For instance, the base station may configure a predetermined number of sidelink resources, associated with a sidelink channel, and a transmitting UE may utilize the predetermined number of sidelink resources to transmit data to a receiving UE over the sidelink channel. In some aspects, the base station may use the transmitting UE as a relay device to extend coverage to the receiving UE, which may be experiencing poor coverage due to, for example, a poor radio link quality.

In another sidelink mode (e.g., Mode-2 Resource Allocation Mode), the base station may configure the predetermined number of sidelink resources accessible for sidelink communication. The plurality of UEs, and not the base station, may control utilization of the predetermined number of sidelink resources by performing scheduling of communications in the sidelink network. For instance, the transmitting UE may autonomously schedule utilization of the predetermined number of sidelink resources to transmit data to the receiving UE.

In either sidelink mode, each of the plurality of UEs in the sidelink network may utilize a fixed amount of bandwidth due to utilizing the predetermined number of sidelink resources. The transmitting UE may utilize a threshold amount of processing power to perform transmission operations associated with utilizing the predetermined number of sidelink resources for every transmission, including when the transmitting UE transmits a nominal amount of data. Similarly, the receiving UE may utilize a threshold amount of processing power to perform reception operations associated with utilizing the predetermined number of sidelink resources for every reception, including when the receiving UE receives the nominal amount of data. As a result, regardless of an amount of data to be communicated, each of the plurality of UEs may utilize a threshold amount of processing power to perform communication operations (e.g., transmission or reception operations) associated with utilizing the predetermined number of sidelink resources for every communication.

Some UEs may be designed for efficient power consumption. Examples of such UEs include MTC UEs and/or NB-IoT devices that may be deployed in the field to perform, for example, infrequent and/or simple communication tasks, and may be provided with single-charge battery solutions. Additional examples include peripheral devices such as biometric sensors/devices or wearable devices (e.g., smart watches, smart clothing, smart glasses, smart ring, smart bracelet, or the like) that are sensitive to excessive power consumption. For such UEs, which can benefit from techniques that curtail power consumption, utilizing the threshold amount of processing power for performing the communication operations associated with utilizing the predetermined number of sidelink resources for each communication may be impracticable.

Further, because the plurality of UEs may not adjust a number of utilized sidelink resources (e.g., reduce the number of utilized sidelink resources for transmission/reception of, for example, the nominal amount of data), a plurality of sidelink resources may remain unutilized during communication of the nominal amount of data. As a result, resource utilization in the sidelink network may be rendered inefficient.

Various aspects of techniques and apparatuses described herein may provide for switching among SL-BWPs that are associated with sidelink communication. In a sidelink network including a plurality of UEs, a transmission from a transmitting UE may be received by one or more of the other of the plurality of UEs (e.g., receiving UEs). The switching among SL-BWPs, as described herein, may assist the transmitting UE in adjusting a number of utilized sidelink resources to enable efficient utilization thereof. In some aspects, the SL-BWPs may have varying bandwidths, which may enable the transmitting UE to adjust the number of utilized sidelink resources based at least in part on an amount of data to be communicated. For instance, the transmitting UE may be enabled to utilize a first SL-BWP, having a smaller bandwidth (e.g., fewer number of sidelink resources) with respect to a second SL-BWP, while transmitting a nominal amount of data, thereby allowing sidelink resources associated with the second SL-BWP to remain available for other purposes. Based at least in part on efficient utilization of the sidelink resources, the transmitting and receiving UEs may curtail power consumption associated with performing communication operations. For instance, a transmitting UE and a receiving UE utilizing, for example, the first SL-BWP to communicate the nominal amount of data may expend less than a threshold amount of processing power to perform communication operations associated with utilizing the predetermined number of sidelink resources. In this way, the plurality of UEs may enable optimized resource utilization and optimized power consumption while communicating in the sidelink network.

In some aspects, a first UE may transmit, to a second UE in a sidelink communication with the first UE, an indication to switch from utilizing a first SL-BWP to utilizing a second SL-BWP, and may selectively switch from utilizing the first SL-BWP to utilizing the second SL-BWP based at least in part on receiving a positive acknowledgment message from the second UE.

Figure 3:
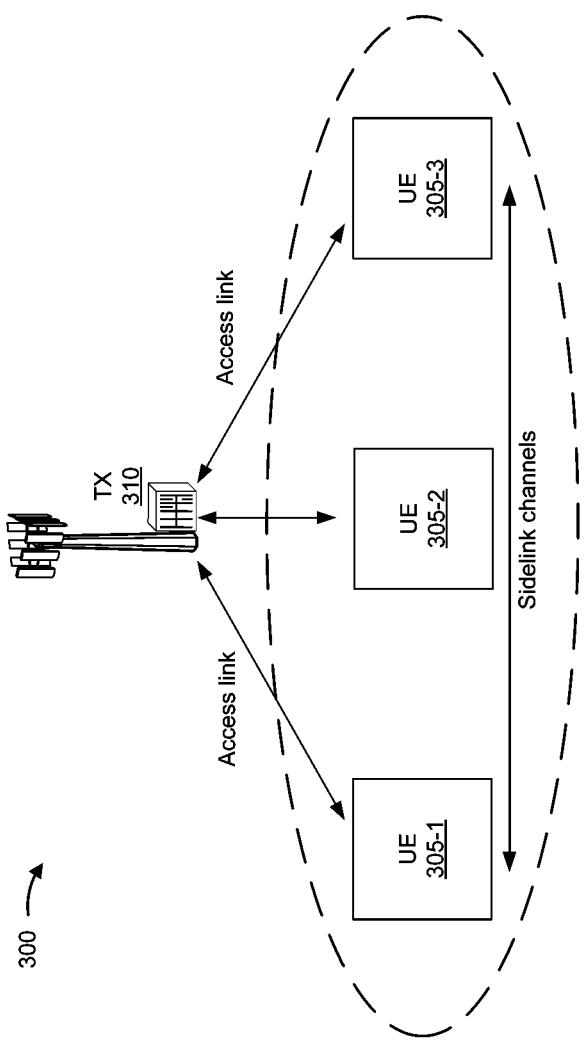
FIG. 3 is a diagram illustrating an example associated with switching among SL-BWPs, in accordance with various aspects of the present disclosure.

FIG. 3 is a diagram illustrating an example 300 associated with switching among SL-BWPs, in accordance with various aspects of the present disclosure. The sidelink communication may take place in a sidelink network including a transmitter (TX) 310 and a plurality of UEs (shown as UE 305-1, UE 305-2, and UE 305-3). The TX 310 may include, for example, a base station (e.g., BS 110) or a relay device. The relay device may include a network node such as, for example, a relay BS, a relay UE, and/or an integrated access and backhaul (IAB) node. Access link communications may be transmitted and received via the access links. For instance, the TX 310 may communicate with the UE 305-1 via a first access link, communicate with the UE 305-2 via a second access link, and/or communicate with the UE 305-3 via a third access link. In some aspects, an access link between the TX 310 and a UE (e.g., the UE 305-1, the UE 305-2, or the UE 305-3) may be implemented utilizing, for example, a Uu interface.

Sidelink communication may be transmitted and received via the sidelink channels. As shown in FIG. 3, the UE 305-1, the UE 305-2, and the UE 305-3 (collectively referred to as UEs 305) may conduct the sidelink communication by communicating (e.g., transmitting and/or receiving data) with one another via one or more sidelink channels. In some aspects, the one or more sidelink channels among the UEs 305 may be implemented utilizing, for example, a PC5 interface. In the sidelink network, a transmitting UE may communicate with one or more of the other plurality of UEs (e.g., receiving UEs). The UEs 305 may include one or more UEs described elsewhere herein, such as UE 120 discussed with respect to FIG. 2.

As indicated above, FIG. 3 is provided as an example. Other examples may differ from what is described with respect to FIG. 3.

Figure 4:
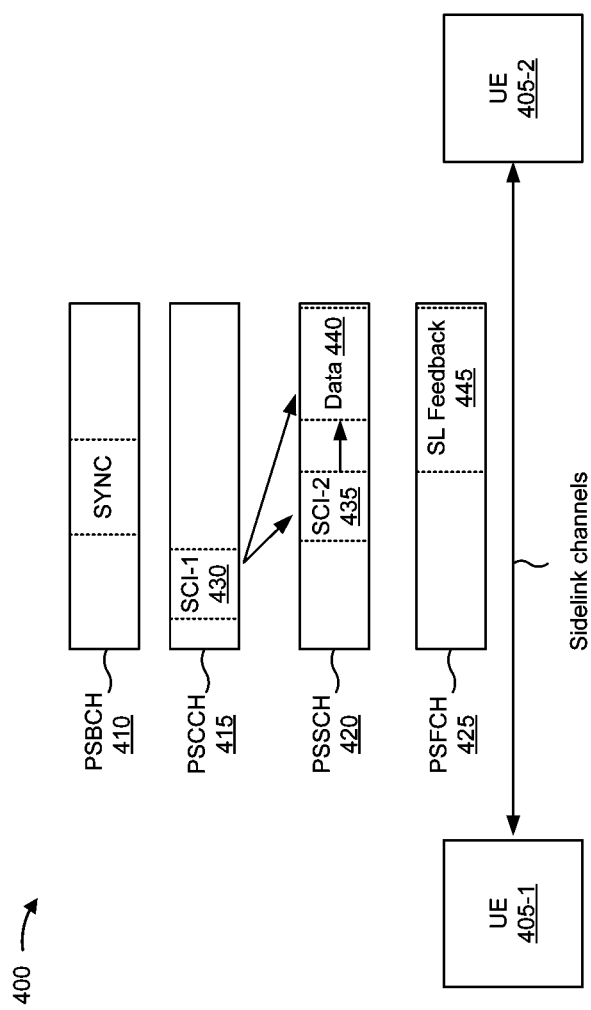
FIG. 4 is a diagram illustrating an example associated with switching among SL-BWPs, in accordance with various aspects of the present disclosure.

FIG. 4 is a diagram illustrating an example 400 associated with switching among SL-BWPs, in accordance with various aspects of the present disclosure. The sidelink communication may take place in a sidelink network including a plurality of UEs including, for example, UE 405-1 and UE 405-2 communicating with each other using one or more sidelink channels. In some aspects, more than two UEs may be included in the sidelink network. The plurality of UEs included in the sidelink network may include a plurality of UEs within a given geographical area (e.g., a given radius around a given UE). In some aspects, the plurality of UEs included in the sidelink network may provide a UE density associated with the sidelink network. For example, the UE density may identify a number of UEs within a threshold distance of, for example, the UE 405-1. In some aspects, the UE 405-1 and/or the UE 405-2 (collectively referred to as UEs 405) may include one or more UEs described elsewhere herein, such as the UE 120 discussed with respect to FIG. 2 and/or the UEs 305 discussed with respect to FIG. 3.

As shown in FIG. 4, the UE 405-1 may communicate with the UE 405-2 via sidelink channels. Communications utilizing the one or more sidelink channels may include, for example, P2P communications, D2D communications, V2X communications (e.g., V2V communications, V2I communications, and/or vehicle-to-person (V2P) communications), and/or mesh networking communications.

In some aspects, the sidelink channels may use a PC5 interface and/or may operate in, for example, a high frequency band (e.g., the 5.9 GHz band) and/or an unlicensed or shared frequency band (e.g., an NR unlicensed (NR-U) frequency band). Additionally, or alternatively, the UEs 405-1, 405-2 may synchronize timing of transmission time intervals (TTIs) (e.g., frames, subframes, slots, and/or symbols) using global navigation satellite system (GNSS) timing.

As further shown in FIG. 4, the sidelink channels may include, for example, a physical sidelink broadcast channel (PSBCH) 410, a physical sidelink control channel (PSCCH) 415, a physical sidelink shared channel (PSSCH) 420, and/or a physical sidelink feedback channel (PSFCH) 425. The PSBCH 410 may be used to communicate sidelink synchronization (SYNC) signals. The PSCCH 415 may be used to communicate control information, similar to a physical downlink control channel (PDCCH) and/or a physical uplink control channel (PUCCH) used for cellular communications with a transmitter (e.g., TX 310) via an access link or an access channel. In some aspects, a transmitting UE may use the PSCCH 415 to transmit, and a receiving UE may use the PSCCH 415 to receive, information (e.g., switching information) associated with switching among SL-BWPs. The PSSCH 420 may be used to communicate data, similar to a physical downlink shared channel (PDSCH) and/or a physical uplink shared channel (PUSCH) used for cellular communications with the transmitter (e.g., TX 310) via an access link or an access channel. In some aspects, a transmitting UE may use the PSSCH 420 to transmit, and a receiving UE may use the PSSCH 420 to receive, information (e.g., switching information) associated with switching among SL-BWPs.

The sidelink channels may carry sidelink control information (SCI) to indicate various control information used for sidelink communications. The sidelink control information may include, for example, sidelink control information part 1 (SCI-1) 430 and sidelink control information part 2 (SCI-2) 435. The SCI-1 430 may be included in the PSCCH 415 and the SCI-2 435 may be included in the PSSCH 420. The SCI-1 430 may include switching information, a scheduling assignment regarding one or more resources of the sidelink channels (e.g., time resources, frequency resources, and/or spatial resources), or the like. In some aspects, the SCI-1 430 may be used to carry one or more feedback messages (e.g., positive acknowledgment message, negative acknowledgment message, or the like) associated with utilization of SL-BWPs. The SCI-2 435 may include various types of information, such as, for example, switching information, a hybrid automatic repeat request (HARQ) process ID, a new data indicator (NDI) associated with the data 440, a unique identifier associated with a transmitting UE (a unique TX ID), a unique identifier associated with a receiving UE (a unique RX ID), and/or a channel state information (CSI) report trigger. In some aspects, the SCI-2 435 may be used to carry one or more feedback messages (e.g., positive acknowledgment message, negative acknowledgment message, or the like) associated with utilization of SL-BWPs.

The PSSCH 420 may also include data 440 and information such as, for example, information for decoding sidelink communications on the PSSCH 420, a quality of service (QoS) priority value, a resource reservation period, a PSSCH demodulation reference signal (DMRS) pattern, an SCI format and/or a beta offset for sidelink control information part 2 (SCI-2) 435 transmitted on the PSSCH 420, a quantity of PSSCH DMRS ports, a medium access control (MAC) message including a MAC control element (MAC-CE), and/or a modulation coding scheme (MCS). The MAC-CE may be used to communicate, for example, switching information associated with switching among SL-BWPs. Additionally, or alternatively, the MAC-CE may be used to communicate feedback messages associated with utilization of SL-BWPs configured for the sidelink network. For instance, the MAC-CE may be used to communicate a positive acknowledgment message, a negative acknowledgment message, or the like associated with utilization of the SL-BWPs.

In some aspects, the UE 405-1 may transmit both the SCI-1 430 and the SCI-2 435. In some aspects, the UE 405-1 may transmit only SCI-1 430, in which case one or more types of the information that would otherwise be transmitted in the SCI-2 435 may be transmitted in the SCI-1 430 instead. The PSFCH 425 may be used to communicate sidelink (SL) feedback 445, such as, for example, HARQ feedback messages (e.g., acknowledgement or negative acknowledgement (ACK/NACK) information), transmit power control (TPC), and/or a scheduling request (SR).

In some aspects, the one or more sidelink channels may use configured sidelink resources (configured by, for example, TX 310) shared by the plurality of UEs. In some aspects, a scheduling assignment (e.g., included in SCI-1 430) may be transmitted in sub-channels using specific resource blocks (RBs) across time. In some aspects, data 440 (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions may be transmitted using non-adjacent RBs.

The configured sidelink resources may include resource blocks, subchannels, resource pools, sidelink bandwidth parts (SL-BWPs), and/or the like. A resource block, a subchannel, a resource pool, and/or a sidelink bandwidth part (SL-BWP) may be a resource in a frequency domain and may be described with respect to a starting frequency and a bandwidth, and/or may be associated with a subcarrier spacing. In some aspects, a subchannel may include one or more resource blocks, a resource pool may include one or more subchannels, and/or a SL-BWP may include one or more resource pools. In some aspects, the transmitter (e.g., TX 310) may configure the sidelink network with one or more SL-BWPs to facilitate utilization of sidelink resources for sidelink communication (e.g., transmitting and/or receiving data). Each of the plurality of UEs may utilize the one or more configured SL-BWPs to transmit data to receiving UEs and/or receive data from a transmitting UE in the sidelink network. In some aspects, a resource requirement of the sidelink network may vary over time. In some aspects, the resource requirement of the sidelink network may vary based at least in part on a number of the plurality of UEs included in the sidelink network. Also, as discussed in further detail with respect to FIG. 5, the plurality of UEs may switch from utilizing a first configured SL-BWP to utilizing another configured SL-BWP. As disclosed herein, the description with respect to BWPs may analogously apply to resource pools. For instance, the UE may analogously switch from utilizing a first configured resource pool to utilizing another configured resource pool.

As indicated above, FIG. 4 is provided as an example. Other examples may differ from what is described with respect to FIG. 4.

Figure 5:
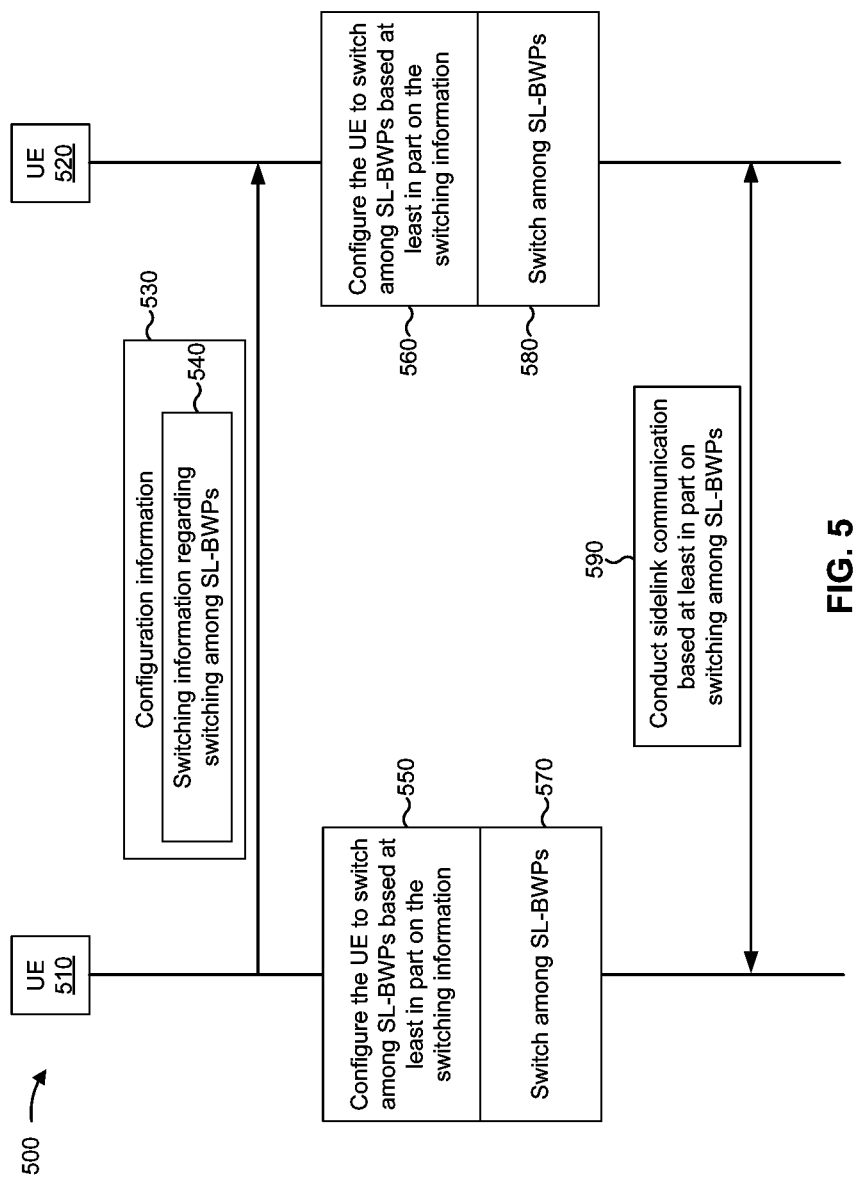
FIG. 5 is a diagram illustrating an example associated with switching among SL-BWPs, in accordance with various aspects of the present disclosure.

FIG. 5 is a diagram illustrating an example 500 associated with switching among SL-BWPs associated with sidelink communication, in accordance with various aspects of the present disclosure. FIG. 5 shows a UE 510 and a UE 520 (collectively referred to as the UEs 510, 520) conducting sidelink communication in a sidelink network. The sidelink network may include a plurality of UEs (including the UEs 510, 520) in sidelink communication with one another. The sidelink communication may include communication (e.g., transmission and/or reception) of data via one or more sidelink channels. In some aspects, the one or more sidelink channels may be implemented utilizing, for example, a PC5 interface. In the sidelink network, a transmitting UE (e.g., the UE 510) may communicate with one or more of the other receiving UEs (e.g., the UE 520). The UEs 510, 520 may include one or more UEs described elsewhere herein, such as the UE 120 discussed with respect to FIG. 2 and/or the UEs 305 discussed with respect to FIG. 3 and/or the UEs 405 discussed with respect to FIG. 4.

In some aspects, the UEs 510, 520 may operate in, for example, a sidelink mode (e.g., Mode-1 Resource Allocation Mode) in which a BS (not shown in FIG. 5) may configure and control utilization of sidelink resources in the sidelink network. Alternatively, the UEs 510, 520 may operate in a sidelink mode (e.g., Mode-2 Resource Allocation Mode) in which the UEs 510, 520 control utilization of sidelink resources in the sidelink network.

As shown by reference number 530, the UE 510 may transmit, and the UE 520 may receive, configuration information at a beginning of and/or during the sidelink communication. In some aspects, the UE 510 may be functioning as a relay device to transmit the configuration information to the UE 520. In some aspects, the UE 510 may transmit, and the UE 520 may receive, the configuration information via, for example, a PSCCH (e.g., PSCCH 415) or a PSSCH (e.g., PSSCH 420). For instance, as discussed in further detail below, the UE 510 may transmit, and the UE 520 may receive, the configuration information via a SCI-1 (e.g., SCI-1 430) transmitted on the PSCCH, or via a SCI-2 (e.g., SCI-2 435) or a MAC-CE transmitted on the PSSCH. In some aspects, the UE 510 may transmit the configuration information to a given UE (e.g., the UE 520) via a unicast sidelink communication, and/or to a group of UEs via a groupcast sidelink communication, and/or to the plurality of UEs in the sidelink network via a broadcast sidelink communication.

In some aspects, the configuration information may include information associated with configured sidelink resources (e.g., frequency resources (subchannels)) to be utilized by the UEs 510, 520 for the sidelink communication. For instance, the configuration information may include information (e.g., resource allocation information) associated with configured SL-BWPs to be utilized by the UEs 510, 520 for the sidelink communication. In some aspects, the configured SL-BWPs may be associated with varying bandwidths (e.g., varying number of sidelink resources). For instance, a first SL-BWP, from among the configured SL-BWPs, may be associated with a first number of sidelink resources, and a second SL-BWP, from among the configured SL-BWPs, may be associated with a second number of sidelink resources. In some aspects, the second number of sidelink resources may be fewer than the first number of sidelink resources. Switching among the first and second SL-BWPs, as described herein, may facilitate efficient utilization of the sidelink resources.

As shown by reference number 540, the configuration information may include switching information associated with switching among configured SL-BWPs. As shown by reference numbers 550 and 560, the UEs 510, 520 may configure the UEs 510, 520 to switch among the configured SL-BWPs based at least in part on the switching information. In some aspects, the UEs 510, 520 may configure the UEs 510, 520 to dynamically switch among the configured SL-BWPs. In some aspects, the UEs 510, 520 may configure the UEs 510, 520 to dynamically switch from utilizing, for example, the first SL-BWP to utilizing, for example, the second SL-BWP.

In some aspects, the switching information may include an indication for the UE 520 to switch from utilizing the first SL-BWP to utilizing the second SL-BWP. In some aspects, the indication may include, for example, an identifier to identify the first SL-BWP and/or an identifier to identify the second SL-BWP, which may assist the UE 520 in switching from utilizing the first SL-BWP to utilizing the second SL-BWP. In some aspects, the UE 510 may transmit, and the UE 520 may receive, the indication by utilizing one or more resources associated with the first SL-BWP, which may be an active SL-BWP that is being actively utilized by the UEs 510, 520 for the sidelink communication. In some aspects, the UE 510 may transmit, and the UE 520 may receive, data (e.g., along with the indication) by utilizing the one or more resources associated with the first SL-BWP.

In some aspects, the UE 510 may transmit, and the UE 520 may receive, the indication via the SCI-1 transmitted on the PSCCH. In some aspects, the UE 510 may transmit, and the UE 520 may receive, the indication via the SCI-2 transmitted on the PSSCH. In some aspects, the UE 510 may transmit, and the UE 520 may receive, the indication via the MAC-CE transmitted on the PSSCH.

In a situation where a PSFCH is configured for a resource pool associated with the first SL-BWP, the UE 520 may transmit, and the UE 510 may receive, a HARQ feedback message utilizing the configured PSFCH. Reception of the HARQ feedback message by the UE 510 may serve to inform the UE 510 that the indication was received by the UE 520. The HARQ feedback message may include a positive acknowledgment message (e.g., ACK) or a negative acknowledgment message (e.g., NACK).

When the negative acknowledgment message is received by the UE 510, the UE 510 may determine that the UE 520 is unable to switch, or has declined to switch, from utilizing the first SL-BWP to utilizing the second SL-BWP. In some aspects, the UE 520 may be unable to switch, or may decline to switch, from utilizing the first SL-BWP to utilizing the second SL-BWP because, for example, the UE 520 may be utilizing one or more resources associated with the second SL-BWP to conduct sidelink communication with another UE, and the UE 510 may be unaware of such sidelink communication between the UE 520 and the other UE. In this case, the UEs 510, 520 may not switch from utilizing the first SL-BWP to utilizing the second SL-BWP. In some aspects, based at least in part on receiving the negative acknowledgment message, the UE 510 may retransmit the indication at a later time.

When the positive acknowledgment message is received by the UE 510, as shown by reference numbers 570 and 580, the UEs 510, 520 may switch from utilizing the first SL-BWP to utilizing the second SL-BWP. In some aspects, the UEs 510, 520 may switch from utilizing the first SL-BWP to utilizing the second SL-BWP based at least in part on the UE 520 receiving the indication transmitted by the UE 510 and/or the UE 510 receiving the positive acknowledgment message transmitted by the UE 520. In some aspects, the UEs 510, 520 may switch from utilizing the first SL-BWP to utilizing the second SL-BWP after a predetermined duration of time after transmission of the indication by the UE 510. A length of the predetermined duration of time may be long enough to account for an amount of time associated with the UE 520 transmitting (and the UE 510 receiving) the HARQ feedback message after receiving the indication transmitted by the UE 510. In some aspects, the length of the predetermined duration of time may be preconfigured by the BS.

In some aspects, when the UE 510 transmits the indication via the PSSCH (e.g., SCI-2 and/or MAC-CE), receipt of the positive acknowledgment message by the UE 510 may be necessary prior to the UEs 510, 520 switching from utilizing the first SL-BWP to utilizing the second SL-BWP. The receipt of the positive acknowledgment message may inform the UE 510 that the UE 520 has adequately received and decoded the PSSCH to receive the indication.

In some aspects, the UE 510 may fail to receive the positive acknowledgment message transmitted by the UE 520 due to, for example, interference in the sidelink communication. In this case, the UE 510 may continue to utilize the first SL-BWP while the UE 520 may switch to utilizing the second SL-BWP. In some aspects, the UE 520 may utilize one or more resources associated with the second SL-BWP to transmit data and/or to retransmit the positive acknowledgment message to the UE 510. As such, the sidelink communication between the UEs 510, 520 may experience an interruption. To avoid such an interruption, a transmission (e.g., transmission of data) utilizing one or more resources associated with the second SL-BWP may be mapped with feedback resources (e.g., configured PSFCH) associated with the first SL-BWP. The feedback resources may include slots, slot offsets, resource blocks, or the like. In this way, the UE 510, while utilizing the first SL-BWP, may receive a feedback message indicating that the UE 520 has switched to utilizing the second SL-BWP. The UE 510 may then also switch to utilizing the second SL-BWP to continue sidelink communication with the UE 520 utilizing the second SL-BWP. When the transmission utilizing the one or more resources associated with the second SL-BWP is not mapped with feedback resources associated with the first SL-BWP, the UE 510 may retransmit the indication utilizing one or more resources associated with the first SL-BWP.

In a situation where a PSFCH is not configured for the resource pool associated with the first SL-BWP, the UE 510 may be unable to receive the HARQ feedback message transmitted by the UE 520. In this case, the UE 520 may transmit, and the UE 510 may receive, the positive acknowledgment message or the negative acknowledgment message via a SCI-1 transmitted on the PSCCH by the UE 520 to the UE 510, via a SCI-2 transmitted on the PSSCH by the UE 520 to the UE 510, and/or via a MAC-CE transmitted on the PSSCH by the UE 520 to the UE 510.

In some aspects, the UEs 510, 520 may switch from utilizing the first SL-BWP to utilizing the second SL-BWP without receiving the positive acknowledgment message. For instance, the UEs 510, 520 may switch from utilizing the first SL-BWP to utilizing the second SL-BWP based at least in part on an expiration of a fixed duration of time after transmission of the indication by the UE 510. In some aspects, the UE 510 may transmit information associated with the fixed duration of time along with the indication to enable the UE 520 to switch from utilizing the first SL-BWP to utilizing the second SL-BWP based at least in part on the expiration of the fixed duration of time. In some aspects, prior to the expiration of the fixed duration of time, the UE 510 may receive data transmitted by the UE 520 by utilizing one or more resources associated with the first SL-BWP. Such reception of data may inform the UE 510 that the UE 520 failed to receive the transmitted indication to switch. Alternatively, such reception of data may act as an implicit negative acknowledgment message to inform the UE 510 that the UE 520 is unable to, or has declined to, switch from utilizing the first SL-BWP to utilizing the second SL-BWP. In this case, the UE 510 may not switch to utilizing the second SL-BWP and may retransmit the indication to the UE 520 at a later time.

In some aspects, the UE 510 may conduct sidelink communication with a plurality of UEs. In an example, the UE 510 may transmit the indication to a first UE (e.g., the UE 520) via a first unicast sidelink communication and may separately transmit the indication to a second UE via a second unicast sidelink communication. In this case, the UE 510 may be acting as a relay UE responsible for supporting the first UE and/or the second UE. In some aspects, the relay UE may generate the indication. In some aspects, the relay UE may receive the indication from TX 510.

Alternatively, the UE 510 may transmit a single indication to a group of UEs, from among a plurality of UEs included in the sidelink network, via a groupcast sidelink communication. Alternatively, the UE 510 may transmit the single indication to the plurality of UEs included in the sidelink network via a broadcast sidelink communication. In some aspects, the UE 510 may transmit information associated with the fixed duration of time and/or information associated with configuration of feedback resources along with the single indication to the group of UEs and/or to the plurality of UEs. One or more UEs included in the group of UEs and/or in the plurality of UEs may transmit the positive acknowledgment message and may switch to utilizing the second SL-BWP based at least in part on the expiration of the fixed duration of time.

As shown by reference number 590, based at least in part on switching to utilizing the second SL-BWP, the UEs 510, 520 (and/or the group of UEs and/or the plurality of UEs) may conduct sidelink communication. The UEs 510, 520 may conduct the sidelink communication by utilizing included transmission circuitry and/or reception circuitry. The transmission circuitry may include, for example, one or more components (e.g., transmit processor 264, TX MIMO processor 266, modulator 254, and/or antennas 252) discussed with respect to FIG. 2, and the reception circuitry may include, for example, one or more components (e.g., receive processor 258, MIMO detector 256, demodulator 254, and/or antennas 252).

The techniques and apparatuses associated with switching among SL-BWPs, as described herein, may assist a UE in dynamically switching from utilizing a first SL-BWP to utilizing a second SL-BWP, the first SL-BWP being associated with a different bandwidth with respect to the second SL-BWP. As a result, the UE may be enabled to efficiently utilize sidelink resources based at least in part on an amount of data to be communicated. Additionally, based at least in part on efficiently utilizing the sidelink resources, UEs designed for efficient power consumption may curtail power consumption associated with performing communication operations. In this way, the UE may enable optimized resource utilization and optimized power consumption while communicating in the sidelink network.

As indicated above, FIG. 5 is provided as an example. Other examples may differ from what is described with respect to FIG. 5.

Figure 6:
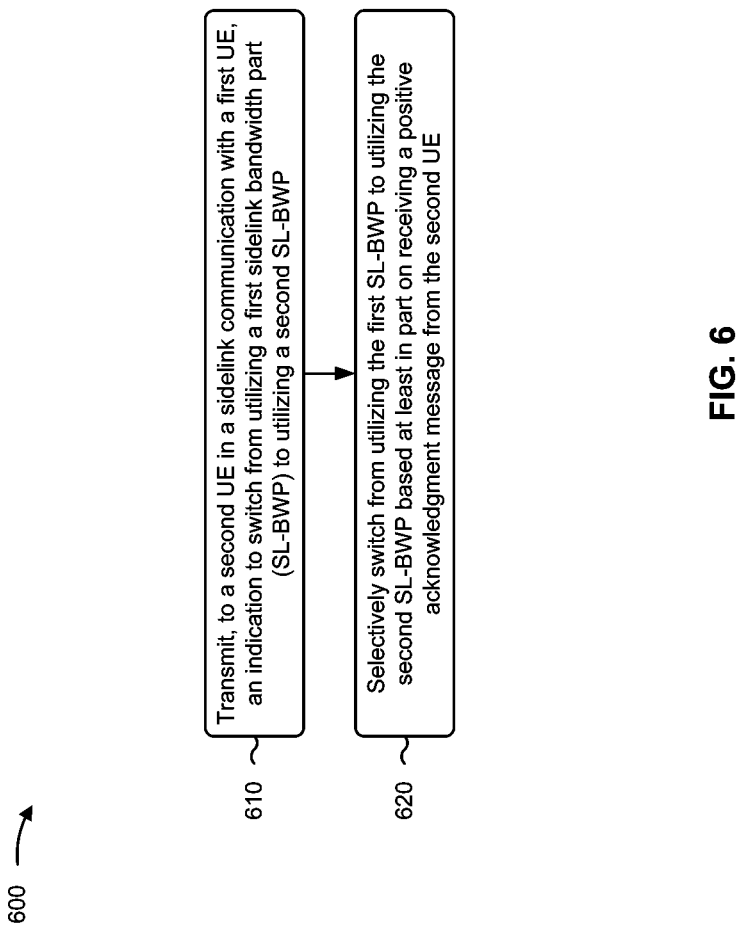
FIG. 6 is a diagram illustrating an example process associated with switching among SL-BWPs, in accordance with various aspects of the present disclosure.

FIG. 6 is a diagram illustrating an example process 600 performed, for example, by a first UE (e.g., UE 120, UE 305, UE 405, UE 510), in accordance with various aspects of the present disclosure. Example process 600 is an example where the UE performs operations associated with switching among SL-BWPs.

As shown in FIG. 6, in some aspects, process 600 may include a first UE transmitting, to a second UE in a sidelink communication with the first UE, an indication to switch from utilizing a first SL-BWP to utilizing a second SL-BWP (block 610). For example, the first UE (e.g., using transmission component 704, depicted in FIG. 7) may transmit, to the second UE in a sidelink communication with the first UE, an indication to switch from utilizing a first SL-BWP to utilizing the second SL-BWP, as described above.

As further shown in FIG. 6, in some aspects, process 600 may include the first UE selectively switching from utilizing the first SL-BWP to utilizing the second SL-BWP based at least in part on receiving a positive acknowledgment message from the second UE (block 620). For example, the first UE (e.g., using a switching component 708, depicted in FIG. 7) may selectively switch from utilizing the first SL-BWP to utilizing the second SL-BWP based at least in part on receiving a positive acknowledgment message from the second UE, as described above.

Process 600 may include additional aspects, such as any single aspect or any combination of aspects described below and/or in connection with one or more other processes described elsewhere herein.

In a first aspect, process 600 includes receiving the positive acknowledgment message from the second UE.

In a second aspect, alone or in combination with the first aspect, the selectively switching includes switching from utilizing the first SL-BWP to utilizing the second SL-BWP based at least in part on a gap duration of time after transmitting the indication.

In a third aspect, alone or in combination with one or more of the first and second aspects, the first SL-BWP is an active SL-BWP being utilized by the first UE and the second UE for the sidelink communication.

In a fourth aspect, alone or in combination with one or more of the first through third aspects, transmitting the indication includes transmitting the indication via a physical sidelink control channel (PSCCH).

In a fifth aspect, alone or in combination with one or more of the first through third aspects, transmitting the indication includes transmitting the indication via a physical sidelink shared channel (PSSCH).

In a sixth aspect, alone or in combination with one or more of the first through fifth aspects, transmitting the indication includes transmitting the indication utilizing a resource associated with the first SL-BWP.

In a seventh aspect, alone or in combination with one or more of the first through sixth aspects, the switching includes switching from utilizing the first SL-BWP to utilizing the second SL-BWP after a predetermined duration of time.

In an eighth aspect, alone or in combination with one or more of the first through seventh aspects, the switching includes switching from utilizing the first SL-BWP to utilizing the second SL-BWP after a predetermined duration of time, which is based at least in part on an amount of time associated with receiving the positive acknowledgment message from the second UE.

In a ninth aspect, alone or in combination with one or more of the first through eighth aspects, process 600 includes mapping a communication associated with the second SL-BWP with a resource, associated with the first SL-BWP, utilized to receive the positive acknowledgment message.

In a tenth aspect, alone or in combination with one or more of the first through ninth aspects, process 600 includes re-transmitting the indication to the second UE when the positive acknowledgment message is not received from the second UE.

In an eleventh aspect, alone or in combination with one or more of the first through tenth aspects, process 600 includes receiving the positive acknowledgment message via a physical sidelink control channel (PSCCH).

In a twelfth aspect, alone or in combination with one or more of the first through eleventh aspects, process 600 includes receiving the positive acknowledgment message via a physical sidelink shared channel (PSSCH).

In a thirteenth aspect, alone or in combination with one or more of the first through twelfth aspects, process 600 includes receiving the positive acknowledgment message via a medium access control (MAC) message.

In a fourteenth aspect, alone or in combination with one or more of the first through thirteenth aspects, process 600 includes receiving data, other than the positive acknowledgment message, from the second UE prior to an expiration of the gap duration of time.

In a fifteenth aspect, alone or in combination with one or more of the first through fourteenth aspects, process 600 includes transmitting the indication to a third UE in sidelink communication with the first UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
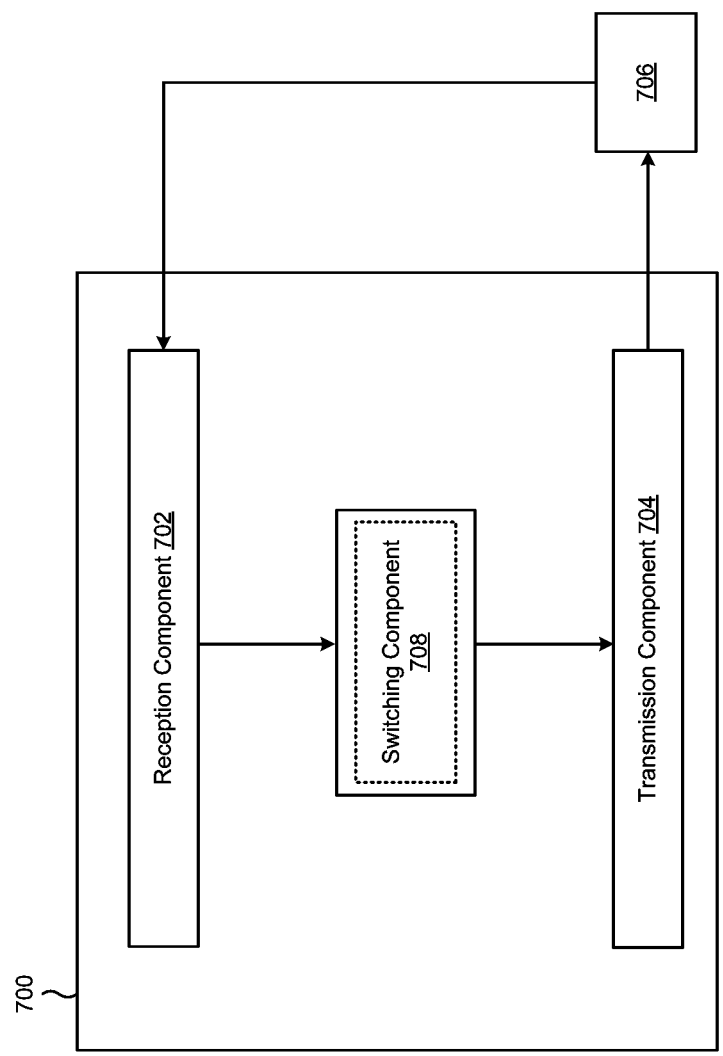
FIG. 7 is a diagram illustrating an example apparatus associated with switching among SL-BWPs, in accordance with various aspects of the present disclosure.

FIG. 7 is a block diagram of an example apparatus 700 for wireless communication. The apparatus 700 may be a first UE (e.g., UE 120, UE 305, UE 405, UE 510), or a first UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE (e.g., UE 520), a base station, or another wireless communication device) using the reception component 702 and the transmission component 704. As further shown, the apparatus 700 may include one or more of a switching component 708, among other examples.

In some aspects, the apparatus 700 may be configured to perform one or more operations described herein in connection with FIGS. 3-5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the first UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the first UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the first UE described above in connection with FIG. 2. In some aspects, the transmission component 704 may be co-located with the reception component 702 in a transceiver.

The transmission component 704 may transmit, to a second UE in a sidelink communication with the first UE, an indication to switch from utilizing a first SL-BWP to utilizing a second SL-BWP. The switching component 708 may selectively switch from utilizing the first SL-BWP to utilizing the second SL-BWP based at least in part on receiving a positive acknowledgment message from the second UE.

The reception component 702 may receive the positive acknowledgment message from the second UE.

The switching component 708 may map a communication associated with the second SL-BWP with a resource, associated with the first SL-BWP, utilized to receive the positive acknowledgment message.

The transmission component 704 may re-transmit the indication to the second UE when the positive acknowledgment message is not received from the second UE.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of aspects of the present disclosure:

Aspect 1: A method of wireless communication performed by a first user equipment (UE), comprising: transmitting, to a second UE in a sidelink communication with the first UE, an indication to switch from utilizing a first sidelink bandwidth part (SL-BWP) to utilizing a second SL-BWP; and selectively switching from utilizing the first SL-BWP to utilizing the second SL-BWP based at least in part on receiving a positive acknowledgment message from the second UE.

Aspect 2: The method of aspect 1, further comprising: receiving the positive acknowledgment message from the second UE utilizing the first SL-BWP.

Aspect 3: The method of any of aspects 1-2, wherein the selectively switching includes switching from utilizing the first SL-BWP to utilizing the second SL-BWP based at least in part on a gap duration of time after transmitting the indication.

Aspect 4: The method of any of aspects 1-3, wherein the first SL-BWP is an active SL-BWP being utilized by the first UE and the second UE for the sidelink communication.

Aspect 5: The method of any of aspects 1-4, wherein transmitting the indication includes transmitting the indication via a physical sidelink control channel (PSCCH).

Aspect 6: The method of any of aspects 1-5, wherein transmitting the indication includes transmitting the indication via a physical sidelink shared channel (PSSCH), a medium access control control element (MAC CE), or sidelink control information part 2 (SCI-2).

Aspect 7: The method of any of aspects 1-6, wherein transmitting the indication includes transmitting the indication utilizing a resource associated with the first SL-BWP.

Aspect 8: The method of any of aspects 1-7, wherein the switching includes switching from utilizing the first SL-BWP to utilizing the second SL-BWP after a predetermined duration of time.

Aspect 9: The method of any of aspects 1-8, wherein the switching includes switching from utilizing the first SL- BWP to utilizing the second SL-BWP after a predetermined duration of time, which is based at least in part on an amount of time associated with receiving the positive acknowledgment message from the second UE.

Aspect 10: The method of any of aspects 1-9, further comprising: mapping a communication associated with the second SL-BWP with a resource, associated with the first SL-BWP, utilized to receive the positive acknowledgment message.

Aspect 11: The method of any of aspects 1-10, further comprising: re-transmitting the indication to the second UE when the positive acknowledgment message is not received from the second UE.

Aspect 12: An apparatus for wireless communication at a device, comprising a processor; memory coupled with the processor; and instructions stored in the memory and executable by the processor to cause the apparatus to perform the method of one or more aspects of aspects 1-11.

Aspect 13: A device for wireless communication, comprising a memory and one or more processors coupled to the memory, the memory and the one or more processors configured to perform the method of one or more aspects of aspects 1-11.

Aspect 14: An apparatus for wireless communication, comprising at least one means for performing the method of one or more aspects of aspects 1-11.

Aspect 15: A non-transitory computer-readable medium storing code for wireless communication, the code comprising instructions executable by a processor to perform the method of one or more aspects of aspects 1-11.

Aspect 16: A non-transitory computer-readable medium storing a set of instructions for wireless communication, the set of instructions comprising one or more instructions that, when executed by one or more processors of a device, cause the device to perform the method of one or more aspects of aspects 1-11.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   a memory; and
   one or more processors coupled to the memory, the one or more processors configured to:
   transmit, to a second UE in a sidelink communication with the first UE, an indication to switch from utilizing a first sidelink bandwidth part (SL-BWP) to utilizing a second SL-BWP;
   receive, from the second UE, hybrid automatic repeat request (HARQ) feedback associated with the indication to switch from utilizing the first SL-BWP to utilizing the second SL-BWP,
   wherein, when a physical sidelink feedback channel (PSFCH) is configured for a resource pool associated with the first SL-BWP, the HARQ feedback is received by the first UE utilizing the first SL-BWP from the second UE utilizing the second SL-BWP on the PSFCH via one or more resources associated with the second SL-BWP mapped to one or more resources associated with the first SL-BWP, or
   wherein, when the PSFCH is not configured for a resource pool associated with the first SL-BWP, the HARQ feedback is received via a sidelink control information part 1 (SCI-1) on a physical sidelink control channel (PSCCH), a sidelink control information part 2 (SCI-2) on a physical sidelink shared channel (PSSCH), or a medium access control-control element (MAC-CE) on the PSSCH; and
switch from utilizing the first SL-BWP to utilizing the second SL-BWP based at least in part on the HARQ feedback.

2. The first UE of claim 1, wherein the HARQ feedback comprises a positive acknowledgment message.

3. The first UE of claim 1, wherein the first SL-BWP is an active SL-BWP being utilized by the first UE and the second UE for the sidelink communication.

4. The first UE of claim 1, wherein the one or more processors, when transmitting the indication, are configured to transmit the indication via the PSCCH.

5. The first UE of claim 1, wherein the one or more processors, when transmitting the indication, are configured to transmit the indication via the PSSCH, the MAC-CE, or the SCI-2.

6. The first UE of claim 1, wherein the one or more processors, when transmitting the indication, are configured to transmit the indication utilizing a resource associated with the first SL-BWP.

7. The first UE of claim 1, wherein the one or more processors, when switching from utilizing the first SL-BWP to utilizing the second SL-BWP, are configured to switch from utilizing the first SL-BWP to utilizing the second SL-BWP after a predetermined duration of time.

8. The first UE of claim 7, wherein the predetermined duration of time is based at least in part on an amount of time associated with receiving the HARQ feedback from the second UE.

9. The first UE of claim 1, wherein the one or more processors are further configured to:
map a communication associated with the second SL-BWP with one or more resources, associated with the first SL-BWP, utilized to receive the HARQ feedback.

10. The first UE of claim 1, wherein the one or more processors are further configured to:
re-transmit the indication to the second UE when an initial transmission of the HARQ feedback is not received from the second UE.

11. The first UE of claim 1, wherein, when the PSFCH is not configured for the resource pool associated with the first SL-BWP, the HARQ feedback is received via the SCI-1 on the PSCCH.

12. The first UE of claim 1, wherein, when the PSFCH is not configured for the resource pool associated with the first SL-BWP, the HARQ feedback is received via the SCI-2 on the PSSCH or the MAC-CE on the PSSCH.

13. The first UE of claim 1, wherein the one or more processors are further configured to:
receive data, other than the HARQ feedback, from the second UE prior to an expiration of a gap duration of time.

14. The first UE of claim 1, wherein the one or more processors, when transmitting the indication to the second UE, are configured to transmit the indication to a third UE in sidelink communication with the first UE.

15. A method of wireless communication performed by a first user equipment (UE), comprising:
transmitting, to a second UE in a sidelink communication with the first UE, an indication to switch from utilizing a first sidelink bandwidth part (SL-BWP) to utilizing a second SL-BWP;
receiving, from the second UE utilizing the first SL-BWP, hybrid automatic repeat request (HARQ) feedback associated with the indication to switch from utilizing the first SL-BWP to utilizing the second SL-BWP,
wherein, when a physical sidelink feedback channel (PSFCH) is configured for a resource pool associated with the first SL-BWP, the HARQ feedback is received by the first UE utilizing the first SL-BWP from the second UE utilizing the second SL-BWP on the PSFCH via one or more resources associated with the second SL-BWP mapped to one or more resources associated with the first SL-BWP, or
wherein, when the PSFCH is not configured for a resource pool associated with the first SL-BWP, the HARQ feedback is received via a sidelink control information part 1 (SCI-1) on a physical sidelink control channel (PSCCH), a sidelink control information part 2 (SCI-2) on a physical sidelink shared channel (PSSCH), or a medium access control-control element (MAC-CE) on the PSSCH; and
switching from utilizing the first SL-BWP to utilizing the second SL-BWP based at least in part on the HARQ feedback.

16. The method of claim 15, wherein the HARQ feedback comprises a positive acknowledgment message.

17. The method of claim 15, wherein the first SL-BWP is an active SL-BWP being utilized by the first UE and the second UE for the sidelink communication.

18. The method of claim 15, wherein transmitting the indication includes transmitting the indication via the PSCCH.

19. The method of claim 15, wherein transmitting the indication includes transmitting the indication via the PSSCH, the MAC-CE, or the SCI-2.

20. The method of claim 15, wherein transmitting the indication includes transmitting the indication utilizing a resource associated with the first SL-BWP.

21. The method of claim 15, wherein the switching from utilizing the first SL-BWP to utilizing the second SL-BWP is after a predetermined duration of time.

22. The method of claim 21, wherein the predetermined duration of time is based at least in part on an amount of time associated with receiving the HARQ feedback from the second.

23. The method of claim 15, further comprising:
mapping a communication associated with the second SL-BWP with a resource, associated with the first SL-BWP, utilized to receive the HARQ feedback.

24. The method of claim 15, further comprising:
re-transmitting the indication to the second UE when an initial transmission of the HARQ feedback is not received from the second UE.

25. A non-transitory computer-readable medium storing a set of instructions for wireless communication, the set of instructions comprising:
one or more instructions that, when executed by one or more processors of a first user equipment (UE), cause the first UE to:
transmit, to a second UE in a sidelink communication with the first UE, an indication to switch from utilizing a first sidelink bandwidth part (SL-BWP) to utilizing a second SL-BWP;
receive, from the second UE utilizing the first SL-BWP, hybrid automatic repeat request (HARQ) feedback associated with the indication to switch from utilizing the first SL-BWP to utilizing the second SL-BWP,
wherein, when a physical sidelink feedback channel (PSFCH) is configured for a resource pool associated with the first SL-BWP, the HARQ feedback is received by the first UE utilizing the first SL-BWP from the second UE utilizing the second SL-BWP on the PSFCH via one or more resources associated with the second SL-BWP mapped to one or more resources associated with the first SL-BWP, or wherein, when the PSFCH is not configured for a resource pool associated with the first SL-BWP, the HARQ feedback is received via a sidelink control information part 1 (SCI-1) on a physical sidelink control channel (PSCCH), a sidelink control information part 2 (SCI-2) on a physical sidelink shared channel (PSSCH), or a medium access control-control element (MAC-CE) on the PSSCH; and switch from utilizing the first SL-BWP to utilizing the second SL-BWP based at least in part on the HARQ feedback.

26. The non-transitory computer-readable medium of claim 25, wherein the HARQ feedback comprises a positive acknowledgment message.

27. The non-transitory computer-readable medium of claim 25, wherein the first SL-BWP is an active SL-BWP being utilized by the first UE and the second UE for the sidelink communication.

28. A first apparatus for wireless communication, comprising:
means for transmitting, to a second apparatus in a sidelink communication with the first apparatus, an indication to switch from utilizing a first sidelink bandwidth part (SL-BWP) to utilizing a second SL-BWP;

means for receiving, from the second apparatus utilizing the first SL-BWP, hybrid automatic repeat request (HARQ) feedback associated with the indication to switch from utilizing the first SL-BWP to utilizing the second SL-BWP, wherein, when a physical sidelink feedback channel (PSFCH) is configured for a resource pool associated with the first SL-BWP, the HARQ feedback is received by the first UE utilizing the first SL-BWP from the second UE utilizing the second SL-BWP on the PSFCH via one or more resources associated with the second SL-BWP mapped to one or more resources associated with the first SL-BWP, or wherein, when the PSFCH is not configured for a resource pool associated with the first SL-BWP, the HARQ feedback is received via a sidelink control information part 1 (SCI-1) on a physical sidelink control channel (PSCCH), a sidelink control information part 2 (SCI-2) on a physical sidelink shared channel (PSSCH), or a medium access control-control element (MAC-CE) on the PSSCH; and means for switching from utilizing the first SL-BWP to utilizing the second SL-BWP based at least in part on the HARQ feedback.

29. The first apparatus of claim 28, wherein the HARQ feedback comprises a positive acknowledgment message.

30. The first apparatus of claim 28, wherein the first SL-BWP is an active SL-BWP being utilized by the first apparatus and the second apparatus for the sidelink communication.

* * * * *